(12) United States Patent
Shih et al.

(10) Patent No.: US 10,715,832 B2
(45) Date of Patent: Jul. 14, 2020

(54) METHOD AND APPARATUS OF BLOCK PARTITION FOR VR360 VIDEO CODING

(71) Applicant: MEDIATEK INC., Hsin-Chu (TW)

(72) Inventors: Cheng-Hsuan Shih, Hsin-Chu (TW); Jian-Liang Lin, Hsin-Chu (TW)

(73) Assignee: MEDIATEK INC., Hsin-chu (TW)

( * ) Notice: Subject to any disclaimer, the term of this patent is extended or adjusted under 35 U.S.C. 154(b) by 0 days.

(21) Appl. No.: 16/299,320

(22) Filed: Mar. 12, 2019

(65) Prior Publication Data

US 2019/0289328 A1 Sep. 19, 2019

Related U.S. Application Data

(60) Provisional application No. 62/643,797, filed on Mar. 16, 2018.

(51) Int. Cl.
*H04N 19/597* (2014.01)
*H04N 19/176* (2014.01)
*H04N 19/119* (2014.01)
*H04N 19/96* (2014.01)

(52) U.S. Cl.
CPC ......... *H04N 19/597* (2014.11); *H04N 19/119* (2014.11); *H04N 19/176* (2014.11); *H04N 19/96* (2014.11)

(58) Field of Classification Search
None
See application file for complete search history.

(56) References Cited

U.S. PATENT DOCUMENTS 10,313,664 B2 * 6/2019 Van Der Auwera ...... G06T 3/00
10,484,682 B2 * 11/2019 Coban ................. H04N 19/597
2017/0272758 A1 9/2017 Lin et al.
2017/0280126 A1* 9/2017 Van der Auwera ..........................
G06T 3/4038
2017/0347095 A1 11/2017 Panusopone et al.
2018/0054613 A1 2/2018 Lin et al.
2018/0103199 A1* 4/2018 Hendry .............. H04N 21/8543
2018/0164593 A1* 6/2018 Van Der Auwera ..........................
G06T 3/0031
2018/0176468 A1* 6/2018 Wang .................... H04N 19/46
2018/0199029 A1* 7/2018 Van Der Auwera ..........................
H04N 13/161

(Continued)

FOREIGN PATENT DOCUMENTS

CN 107801039 A 3/2018
WO 2018035721 A1 3/2018

OTHER PUBLICATIONS

R. Skupin, et al., Standardization Status of 360 degree Video Coding and Delivery, Published on Dec. 13, 2017 in Germany, pp. 1-4.

*Primary Examiner* — Reza Aghevli
(74) *Attorney, Agent, or Firm* — McClure, Qualey & Rosack, LLP

(57) ABSTRACT

Methods and apparatus of processing 360-degree virtual reality (VR360) pictures are disclosed. According to one method, if a leaf coding unit contains one or more face edges, the leaf processing unit is split into sub-processing units along the face edges without the need to signal the partition. In another method, if the quadtree (QT) of binary tree (BT) partition depth for a processing unit has not reached the maximum QT or BT depth, the processing unit is split. If the processing unit contains a horizontal face edge, QT or horizontal BT partition is applied. If the processing unit contains a vertical face edge, QT or vertical BT partition is applied.

10 Claims, 15 Drawing Sheets

(56) References Cited

U.S. PATENT DOCUMENTS

| | | | |
|---|---|---|---|
| 2018/0268516 A1* | 9/2018 | Coban | G06T 3/0087 |
| 2018/0268517 A1* | 9/2018 | Coban | H04N 19/597 |
| 2018/0276789 A1* | 9/2018 | Van Der Auwera | G06T 3/0062 |
| 2018/0276826 A1* | 9/2018 | Van Der Auwera | H04N 13/117 |
| 2019/0007679 A1* | 1/2019 | Coban | H04N 19/105 |
| 2019/0014347 A1* | 1/2019 | Hendry | H04N 19/176 |
| 2019/0230377 A1* | 7/2019 | Ma | H04N 19/105 |
| 2019/0253622 A1* | 8/2019 | Van der Auwera | H04N 19/46 |
| 2019/0253703 A1* | 8/2019 | Coban | H04N 19/597 |
| 2019/0268608 A1* | 8/2019 | Ma | H04N 19/513 |

\* cited by examiner

METHOD AND APPARATUS OF BLOCK PARTITION FOR VR360 VIDEO CODING

CROSS REFERENCE TO RELATED APPLICATIONS

The present invention claims priority to U.S. Provisional Patent Application, Ser. No. 62/643,797, filed on Mar. 16, 2018. The U.S. Provisional Patent Application is hereby incorporated by reference in its entirety.

FIELD OF THE INVENTION

The present invention relates to picture processing for 360-degree virtual reality (VR) pictures. In particular, the present invention relates to block partition for VR360 video coding.

BACKGROUND AND RELATED ART

The 360-degree video, also known as immersive video is an emerging technology, which can provide "feeling as sensation of present". The sense of immersion is achieved by surrounding a user with wrap-around scene covering a panoramic view, in particular, 360-degree field of view. The "feeling as sensation of present" can be further improved by stereographic rendering. Accordingly, the panoramic video is being widely used in Virtual Reality (VR) applications.

Immersive video involves the capturing a scene using multiple cameras to cover a panoramic view, such as 360-degree field of view. The immersive camera usually uses a panoramic camera or a set of cameras arranged to capture 360-degree field of view. Typically, two or more cameras are used for the immersive camera. All videos must be taken simultaneously and separate fragments (also called separate perspectives) of the scene are recorded. Furthermore, the set of cameras are often arranged to capture views horizontally, while other arrangements of the cameras are possible.

The 360-degree virtual reality (VR) pictures may be captured using a 360-degree spherical panoramic camera or multiple pictures arranged to cover all filed of views around 360 degrees. The three-dimensional (3D) spherical picture is difficult to process or store using the conventional picture/video processing devices. Therefore, the 360-degree VR pictures are often converted to a two-dimensional (2D) format using a 3D-to-2D projection method, such as EquiRectangular Projection (ERP) and CubeMap Projection (CMP). Besides the ERP and CMP projection formats, there are various other VR projection formats, such as OctaHedron Projection (OHP), icosahedron projection (ISP), Segmented Sphere Projection (SSP) and Rotated Sphere Projection (RSP) that are widely used in the field.

The VR360 video sequence usually requires more storage space than the conventional 2D video sequence. Therefore, video compression is often applied to VR360 video sequence to reduce the storage space for storage or the bit rate for streaming/transmission.

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). VR360 video sequences can be coded using HEVC. However, the present invention may also be applicable for other coding methods.

In HEVC, one slice is partitioned into multiple coding tree units (CTU). For color pictures, a color slice may be a partitioned into multiple coding tree blocks (CTB). The CTU is further partitioned into multiple coding units (CUs) to adapt to various local characteristics. HEVC supports multiple Intra prediction modes and for Intra coded CU, the selected Intra prediction mode is signaled. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. After prediction, the residues associated with the CU are partitioned into transform blocks, named transform units (TUs) for the transform process.

Binary tree structure is more flexible than quadtree structure since more partition shapes can be supported, which is also the source of coding efficiency improvement. However, the encoding complexity will also increase in order to select the best partition shape. In order to balance the complexity and coding efficiency, a method to combine the quadtree and binary tree structure has been disclosed. According to this block partition structure, a block is firstly partitioned by a quadtree structure. Binary tree splitting can be applied to further split a block vertically or horizontally.

In conventional video coding, the block partition is applied to the picture or a region (e.g. a slice). However, a VR360 picture may contain discontinuous boundaries within the picture. The conventional block partition may not be suitable for VR360 pictures. Therefore, it is desirable to develop block partition methods that will take into account the characteristics of VR360 video sequences.

BRIEF SUMMARY OF THE INVENTION

Methods and apparatus of processing 360-degree virtual reality (VR360) pictures are disclosed. According to one method, a target processing unit in a VR picture is received, where the VR picture corresponds to a 2D (two-dimensional) picture projected from a 3D (three-dimensional) picture according to a target projection format. The target processing unit is partitioned into one or more child processing units using quadtree (QT) partition and/or binary tree (BT) partition. When one target child processing unit is one leaf processing unit and contains one or more face edges, said one target child processing unit are split into two or more final leaf processing units along said one or more face edges, and each of said two or more final leaf processing units contains no face edge. When one target child processing unit is one leaf processing unit and contains no face edge, said one target child processing unit is designated as one final leaf processing unit. Said one or more final leaf processing units are then encoded or decoded.

The target processing unit may correspond to one coding unit (CU). Whether one target child processing unit contains any face edge can be determined based on a block location and block size of said one target child processing unit in the VR picture and one or more face edge locations of the VR picture in the target projection format. Therefore, information regarding whether said one target child processing unit contains any face edge can be indicated implicitly without signaling the information. Also, information regarding a location of any face edge in said one target child processing unit can be indicated implicitly without signaling the information.

The target projection format may correspond to Cubemap Projection (CMP), Barrel layout, Segmented-Sphere Projection (SSP), Octahedron Projection (OHP), Rotated Sphere Projection (RSP), Icosahedron Projection (ISP), or Adjusted Cubemap Projection (ACP).

When said one target child processing unit is one leaf prediction unit and contains one horizontal or vertical face edge, said one target child processing unit is split into two final leaf processing units along said one horizontal or vertical face edge. When said one target child processing unit is one leaf prediction unit and contains one horizontal face edge and one vertical face edge, said one target child processing unit is split into four final leaf processing units along said one horizontal face edge and said one vertical face edge.

Each of said one or more child processing units may correspond to one leaf processing unit.

According to a second method, the target processing unit is partitioned into one or more child processing units using quadtree (QT) partition and/or binary tree (BT) partition. When one target child processing unit contains only one face edge and maximum QT depth and/or maximum BT depth associated with said one target child processing unit is not reached, said one target child processing unit is split horizontally into two horizontal child processing units when only one face edge is one horizontal face edge and said one target child processing unit is split vertically into two vertical child processing units when only one face edge is one vertical face edge. One or more final leaf processing units are encoded or decoded, where said one or more final leaf processing units comprise said two horizontal child processing units or said two vertical child processing units, or two or more second horizontal child processing units or two or more second vertical child processing units further partitioned from said two horizontal child processing units or said two vertical child processing units respectively. The target processing unit may correspond to one coding unit (CU).

When one target child processing unit contains two or more face edges and the maximum QT depth and/or the maximum BT depth associated with said one target child processing unit is not reached, said one target child processing unit is split horizontally and vertically into four third child processing units. In this case, if one third child processing unit contains only one face edge and maximum QT depth and/or maximum BT depth associated with said one third child processing unit is not reached, said one third child processing unit is split horizontally into two fourth horizontal child processing units when only one face edge in said one third child processing unit is one horizontal face edge, and said one third child processing unit is split vertically into two fourth vertical child processing units when only one face edge in said one third child processing unit is one vertical face edge. Furthermore, said one or more final leaf processing units further comprise said two fourth horizontal child processing units or said two fourth vertical child processing units, or two or more fifth horizontal child processing units further partitioned from said two fourth horizontal child processing units or two or more fifth vertical child processing units further partitioned from said two fourth vertical child processing units.

When one target child processing unit contains no face edge and the maximum QT depth and/or the maximum BT depth associated with said one target child processing unit is not reached, said one target child processing unit is split using the QT partition or the BT partition into one or more sixth child processing units.

Information regarding whether one target child processing unit contains any face edge can be indicated implicitly without signaling the information. Whether one target child processing unit contains any face edge can be determined based on the block location and block size of said one target child processing unit in the VR picture and one or more face edge locations of the VR picture in the target projection format.

DETAILED DESCRIPTION OF THE INVENTION

Figure 1:
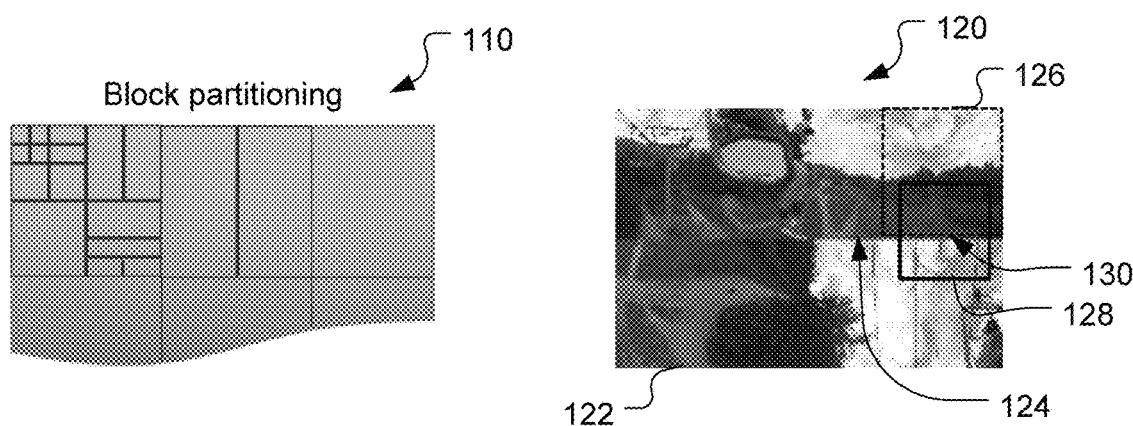
FIG. 1 illustrates an example of block partition and the issue related to discontinuous edge in a block of a VR360 picture.

The following description is of the best-contemplated mode of carrying out the invention. This description is made for the purpose of illustrating the general principles of the invention and should not be taken in a limiting sense. The scope of the invention is best determined by reference to the appended claims.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

In the description like reference numbers appearing in the drawings and description designate corresponding or like elements among the different views.

As mentioned above, block partition is always applied to divide a picture into multiple block (e.g. CUs) for block-based coding systems, and the coding process is applied to individual blocks. However, for VR360 video, one or more face edges may exist in the VR360 video, and the video content across face edge may exhibit some abrupt changes across the face edge. The face edge inside CUs (Coding Units) will cause negative effects on the video coding efficiency. Accordingly, the present invention disclosed block partition methods for VR360 video to improve coding efficiency. FIG. 1 illustrates an example of block partition 110 and the issue related to discontinuous edge in a block (e.g. a CU) 120. The block partition 110 represents a result of multiple partition stages using quadtree (QT) partition and binary tree (BT) partition. For VR360 picture partition 120, a 3×2 cubemap picture 122 consists of six faces with three faces on the top and three faces on the bottom. The three faces on the top have continuous contents in the horizontal direction. Similarly, the three faces on the bottom have continuous contents in the horizontal direction. A horizontal line 124 indicates the face edges between the top sub-frame the bottom sub-frame. The face in the right side of the top sub-frame is indicated by a dash-line box 126. According to conventional block partition, a block 128 (e.g. a CU) may contain the face edge 130.

Figure 2:
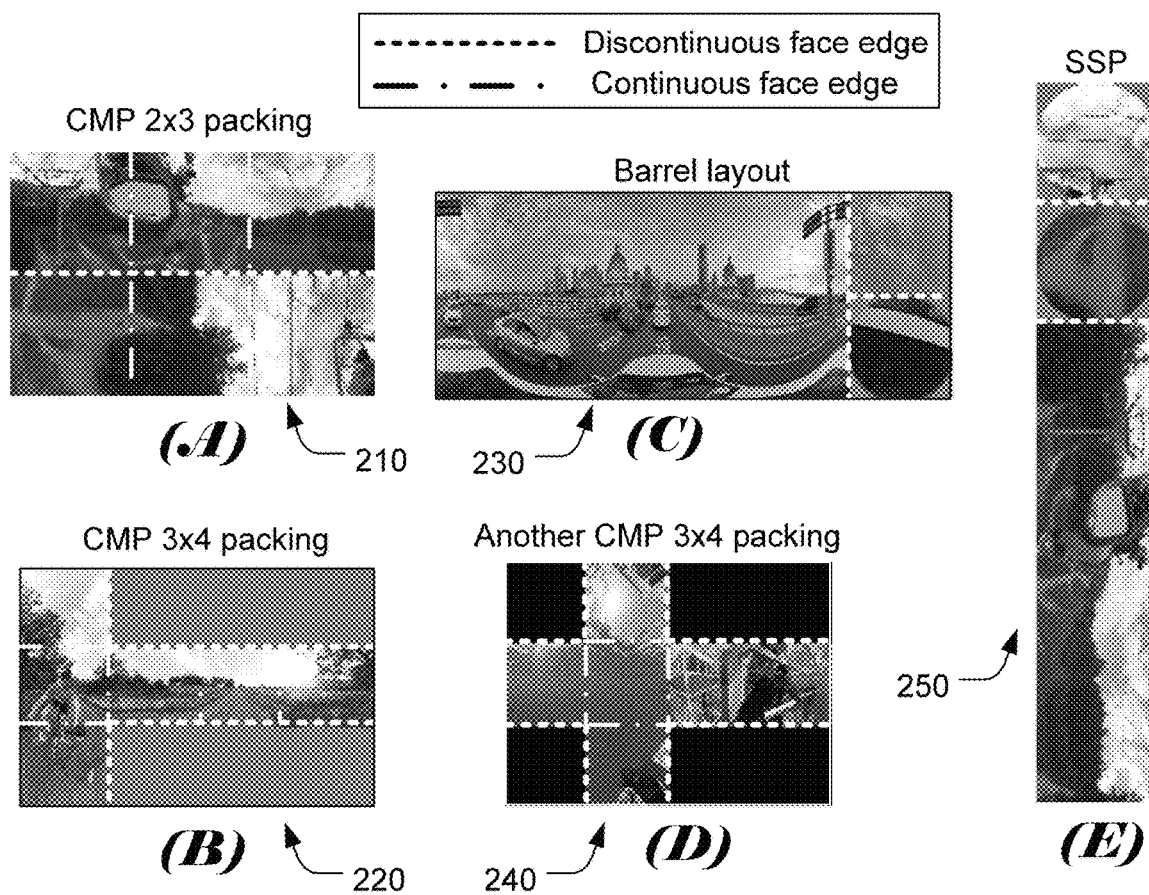
FIG. 2 illustrates face edges within a VR360 picture for various projection formats, where the dashed line indicate a discontinuous face edge and the dot-dashed line indicates a continuous face edge.

Within a VR360 picture, there may exist many face edges. The picture content may be continuous through some of face edge and discontinuous for other face edges within a VR360 picture. FIG. 2 illustrates face edges within a VR360 picture for various projection formats. In FIG. 2(A), the 3×2 Cubemap Projection (CMP) format 210 is shown, where the dashed line indicate a discontinuous face edge and the dot-dashed line indicates a continuous face edge. FIG. 2(B) illustrates continuous and discontinuous face edges within a VR360 picture in the CMP format with 3×4 packing 220). FIG. 2(C) illustrates continuous and discontinuous face edges within a VR360 picture in the Barrel layout format 230. FIG. 2(D) illustrates continuous and discontinuous face edges within a VR360 picture in another CMP format with 3×4 packing 240. FIG. 2(E) illustrates continuous and discontinuous face edges within a VR360 picture in the Segmented-Sphere Projection (SSP) format 250.

Figure 3:
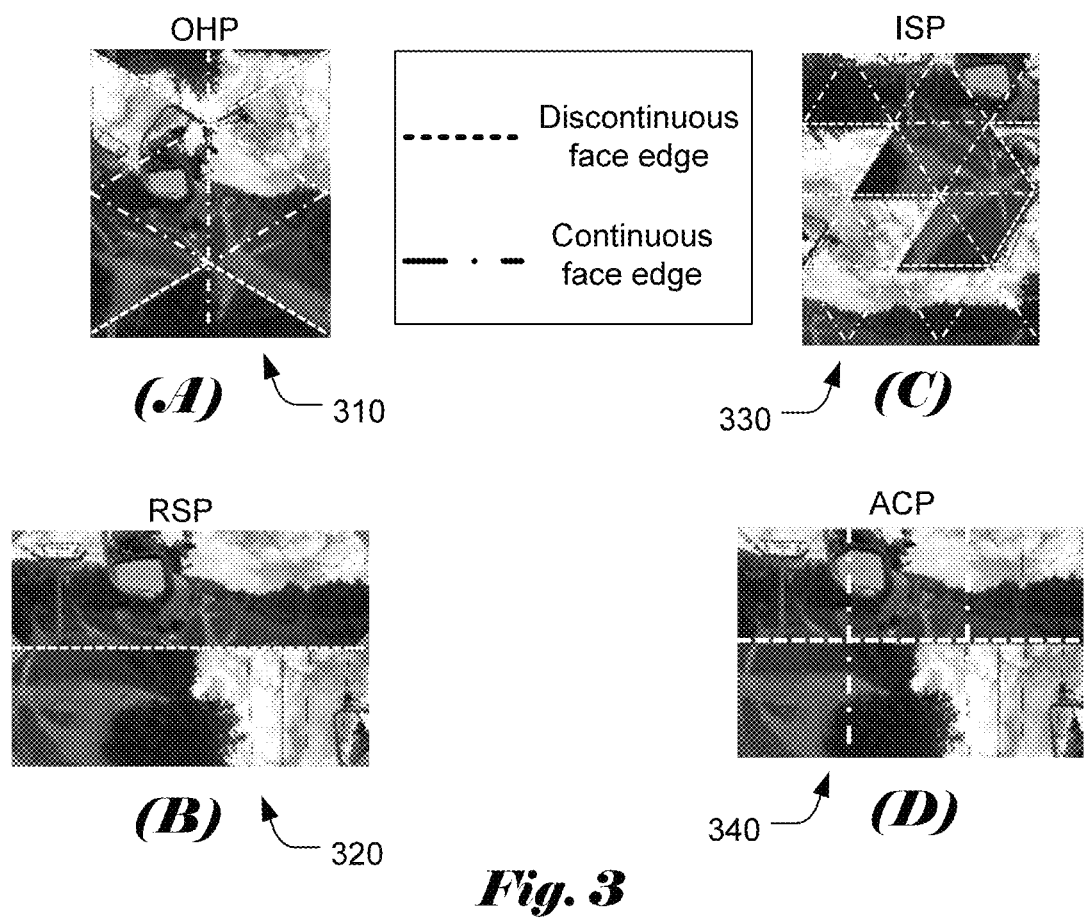
FIG. 3 illustrates face edges within a VR360 picture for more projection formats, where the dashed line indicate a discontinuous face edge and the dot-dashed line indicates a continuous face edge.

FIG. 3 illustrates face edges within a VR360 picture for more projection formats, where the dashed line indicate a discontinuous face edge and the dot-dashed line indicates a continuous face edge. FIG. 3(A) illustrates continuous and discontinuous face edges within a VR360 picture in the Octahedron Projection (OHP) format 310. FIG. 3(B) illustrates continuous and discontinuous face edges within a VR360 picture in the Rotated Sphere Projection (RSP) format 320. FIG. 3(C) illustrates continuous and discontinuous face edges within a VR360 picture in the Icosahedron Projection (ISP) format 330). FIG. 3(D) illustrates continuous and discontinuous face edges within a VR360 picture in the Adjusted Cubemap Projection (ACP) format 340.

In order to overcome the discontinuous edge within a CU issue, VR360-aware block partition methods are disclosed in the present invention.

Block Splitting Method A

According Method A, a leaf CU containing a face edge inside the CU is split into one or more sub-CUs along the face edge of the leaf CU without signaling additional coding flags associated with the partition modes.

Figure 4:
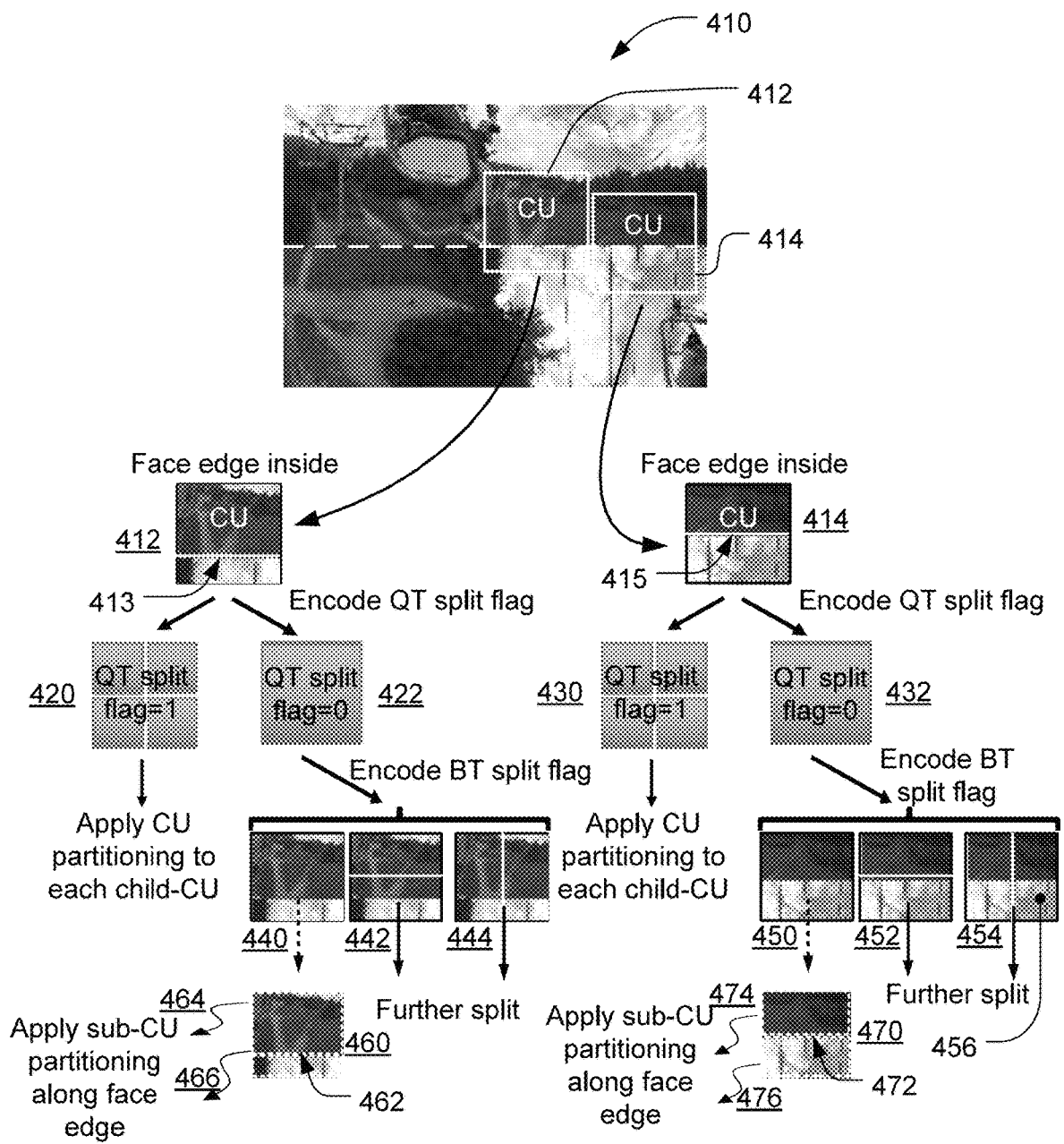
FIG. 4 illustrates an example VR block partition according to an embodiment of the present invention, where a CU containing a face edge is partitioned into multiple sub-CUs along the face edge.

FIG. 4 illustrates an example VR block partition according to an embodiment of the present invention. The VR picture being processed in this example corresponds to a 3×2 CMP picture 410. Two CUs (412 and 414) are selected to illustrate the block partition according to an embodiment of the present invention. CU 412 contains a horizontal face edge 413 in the lower part of the block. The quadtree (QT) partition is first checked for CU 412. If the QT splitting 420 is selected, CU 412 will be split into 4 sub-blocks and a QT split flag equal to 1 will be used to indicate the QT splitting. In this case, further block partition may be applied to the child nodes. If no QT splitting 422 is selected, CU 412 will not be split by the QT partition. A QT split flag equal to 0 will be used to indicate no QT splitting. In this case, BT partition will be checked for CU 412. There are three possible BT partitions including no partition 440, horizontal partition 442 and vertical partition 444. For the partition results (i.e., child nodes) from the horizontal partition 442 and vertical partition 444, the child nodes may be further partitioned. According to the conventional block partition, block 440 becomes a leaf node, i.e., a CU. As shown in block 440, there is a horizontal face edge near the lower part of the block. According to an embodiment of the present invention, block 440 will be further partitioned along the horizontal face edge 462 to form a partitioned block 460 consisting of top block (i.e., a CU) 464 and bottom block (i.e. a CU) 466. A BT split flag will be signaled to indicate one of the three possible BT partitions selected.

CU 414 also contains a horizontal face edge 415 in the middle of the block. The quadtree (QT) partition is first checked for CU 414. If the QT splitting 430 is selected, CU 414 will be split into 4 sub-blocks and a QT split flag equal to 1 will be used to indicate the QT splitting. In this case, further block partition may be applied to the child nodes. If no QT splitting 432 is selected, CU 414 will not be split by the QT partition. A QT split flag equal to 0 will be used to indicate no QT splitting. In this case, BT partition will be checked for CU 414. There are three possible BT partitions including no partition 450, horizontal partition 452 and vertical partition 454 and a BT split flag will be signaled to indicate one of the three possible BT partitions selected. For the partition results (i.e., child nodes) from the horizontal partition 452 and vertical partition 454, the child nodes may be further partitioned. According to the conventional block partition, block 450 becomes a leaf node, i.e., a CU. As shown in block 450, there is a horizontal face edge in the middle of the block. According to an embodiment of the present invention, block 450 will be further partitioned along the horizontal face edge 472 to form a partitioned block 470 consisting of top block (i.e., a CU) 474 and bottom block (i.e. a CU) 476.

Figure 5:
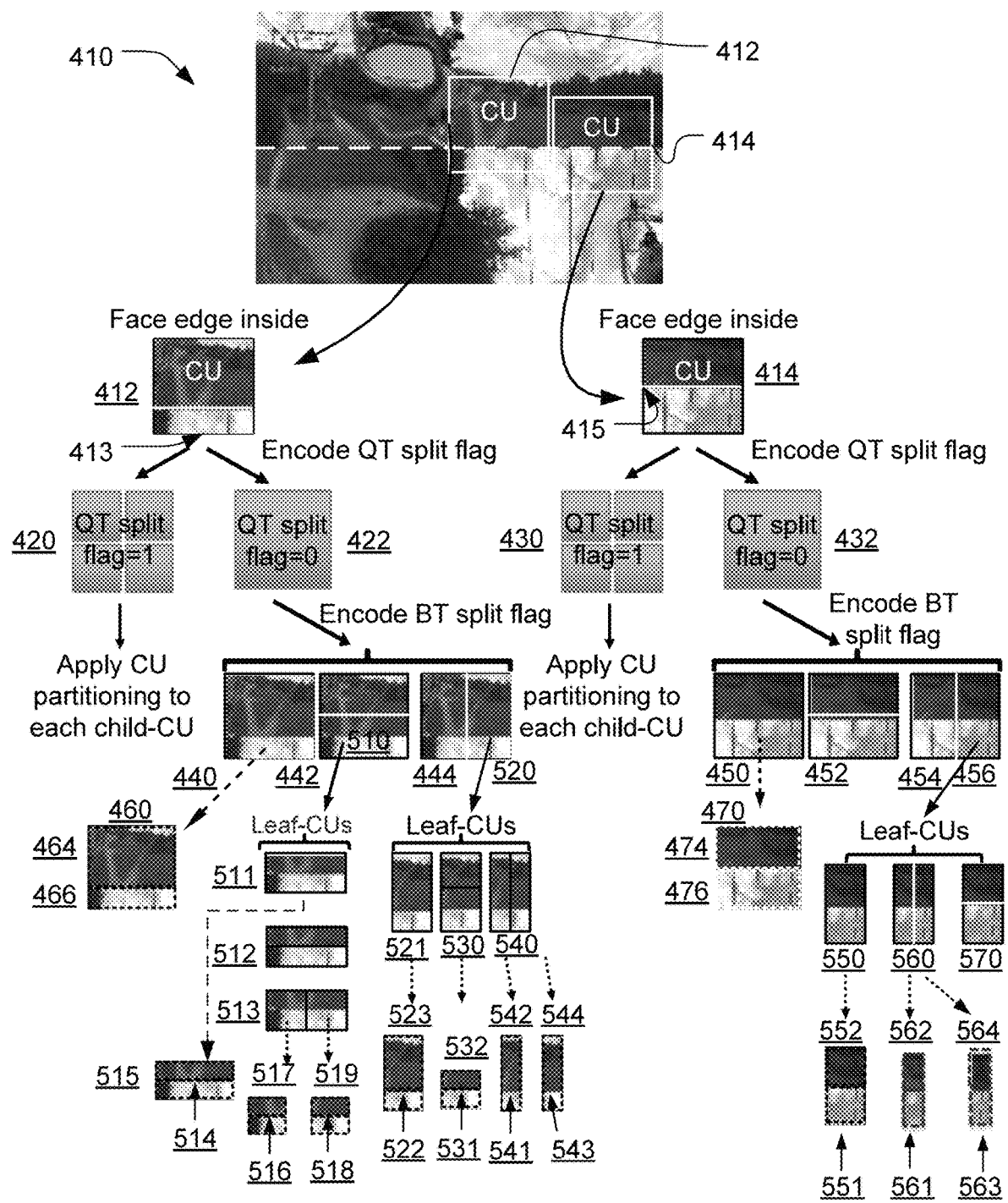
FIG. 5 illustrates an example VR block partition according to an embodiment of the present invention to further partition the blocks resulted from FIG. 4.

FIG. 5 illustrates further block partition of the nodes partitioned by the BT partition in FIG. 4. The lower block 510 of the horizontal BT partitioned block 442 contains a horizontal face edge. The BT partition is checked for the lower block of the horizontal BT partitioned block 442. Either no partition 511, horizontal partition 512 or vertical partition 513 may be used. If no partition is selected for the lower block 510, block 511 will become a CU according to the conventional block partition. However, block 511 contains a horizontal face edge. According to an embodiment of the present invention, block 511 is further partitioned along the face edge 514 into a partitioned block 515 containing a top sub-block and a bottom sub-block. Both the sub-blocks are free from any face edge. When horizontal BT partition 512 is selected, the horizontal BT partition is along the face edge so that the resulting sub-blocks are free from any face edge. When the vertical BT partition 513 is selected, both sub-blocks contains a face edge. According to an embodiment of the present invention, the sub-blocks are partitioned along the face edge 516 and 518 into partitioned sub-blocks 517 and 519 respectively according to an embodiment of the present invention. For the top sub-block of block 442, there is no face edge and the top block can be further partitioned using conventional partition. When the vertical BT partition 444 is selected for block 422, both the right sub-block and the left sub-block are subject to further partition. The partition example is shown for the right sub-block 520 and the same process can be applied to the left sub-block. For sub-block 520, either no partition 521, horizontal partition 530 and vertical partition 540 can be selected. When no partition 521 is selected, the sub-block becomes a CU, which contains a horizontal face edge. According to an embodiment of the present invention, block 521 is partitioned along the horizontal face edge 522 into partitioned sub-blocks 523 (i.e., a top sub-block and a bottom sub-block). For the horizontal partition 530, the lower part still contains a face edge. According to an embodiment of the present invention, block 530 is partitioned along the horizontal face edge 531 into partitioned sub-blocks 532 (i.e., a top sub-block and a bottom sub-block). For the vertical partition 540, both sub-blocks contain a horizontal face edge. According to an embodiment of the present invention, the sub-blocks are partitioned along the face edge 541 and 543 into partitioned sub-blocks 542 and 544 respectively (i.e., a top sub-block and a bottom sub-block).

In FIG. 4, no QT split 432 may be selected for CU 414 and the CU may be further partitioned by one or more stages of BT partition. After final BT partition, the final blocks (i.e., leaf CUs) may contain a face edge. An example of leaf CUs after the BT partition is applied to the right partition (456) of the vertically partitioned block 454 is shown, where the right-side partition can be no BT partition 550, vertical BT partition 560 or horizontal BT partition 570. For the horizontal BT partition 570, the resulted sub-blocks are free from face edge. However, CU 550 and CU 560 both contain a horizontal face edge. According to an embodiment of the present invention, the CU is split along the face edge into sub-CUs so that the sub-CU are free from any face edge. For example, CU 550 is split along the face edge 551 into partitioned sub-CUs 552 (i.e., a top sub-CU and bottom sub-CU). The left partition of block 560 is split along the face edge 561 into partitioned sub-CUs 562 (i.e., a top sub-CU and bottom sub-CU). Similarly, the right partition of block 560 is split along the face edge 563 into partitioned sub-CUs 564 (i.e., a top sub-CU and bottom sub-CU). The final CUs and sub-CUs according to the present invention are all free from face edge within the CUs and sub-CUs.

Figure 6:
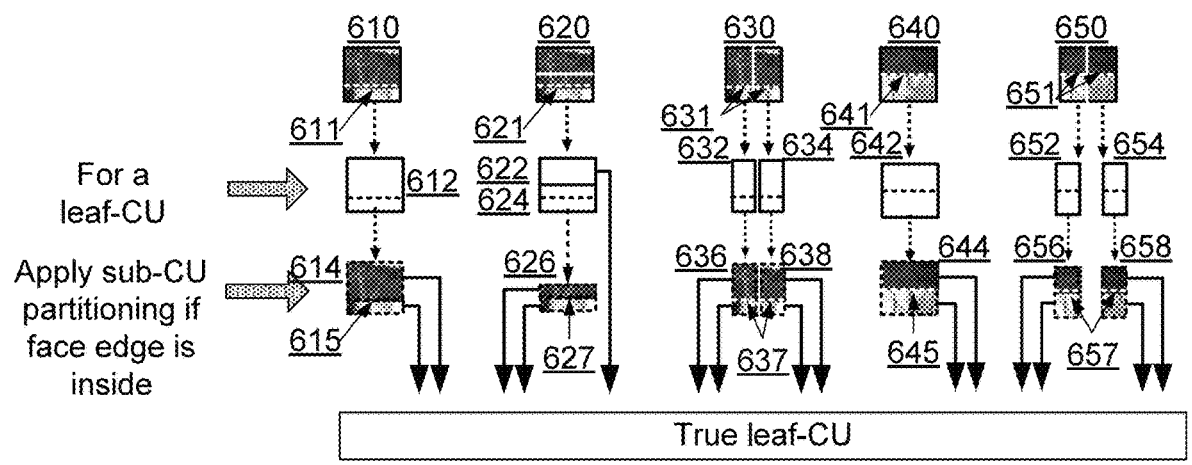
FIG. 6 illustrates examples of sub-CU partitioning to the leaf CUs containing a face edge according to an embodiment of the present invention.

According to Method A of the present invention, a block of the VR picture is partitioned into leaf CUs first using conventional block partition. Each leaf CU is checked to determine whether a face edge inside is a leaf-CU or not. For a leaf-CU with one face edge inside, sub-CU partitioning along the face edge is applied to the leaf CU to divide it into two sub-CUs. The resulting sub-CUs are used as the true leaf-CUs. FIG. 6 illustrates examples of sub-CU partitioning to the leaf CUs containing a face edge. In FIG. 6, block 610 corresponds to a leaf CU containing a horizontal face edge in the lower part of the block as shown as a dash line 611. In other words, CU 612 contains a face edge as indicated by the dash line. According to Method A, block 610 is divided into two sub-CUs 614 (i.e., a top sub-CU and bottom sub-CU) along the face edge 615. Block 620 corresponds to two leaf CUs (622 and 624) where the lower leaf CU 624 contains a face edge as shown as a dash line. According to Method A, the top sub-CU 622 is treated as a final leaf-CU and the bottom sub-CU 624 is further divided into two sub-CUs 626 (i.e., a top sub-CU and bottom sub-CU) along the face edge 627. Block 630 corresponds to two leaf CUs (632 and 634) containing a face edge in the lower part as shown as a dash line 631. According to Method A, sub-CU 632 is divided into two sub-CUs 636 (i.e., top and bottom sub-CUs) along the face edge 637, and sub-CU 634 is divided into two sub-CUs 638 (i.e., top and bottom sub-CUs) along the face edge 637. Block 640 corresponds to a leaf CU containing a face edge as shown as a dash line 641. In other words, CU 642 contains a face edge as indicated by the dash line. According to Method A, block 640 is divided into two sub-CUs 644 (i.e., top and bottom sub-CUs) along the face edge 645. Block 650 corresponds to two leaf CUs (652 and 654) containing a face edge in the middle as shown as a dash line 651. According to Method A, sub-CU 652 is divided into two sub-CUs 656 (i.e., top and bottom sub- CUs) along the face edge 657, and sub-CU 654 is divided into two sub-CUs 658 (i.e., top and bottom sub-CUs) along the face edge 657.

Figure 7:
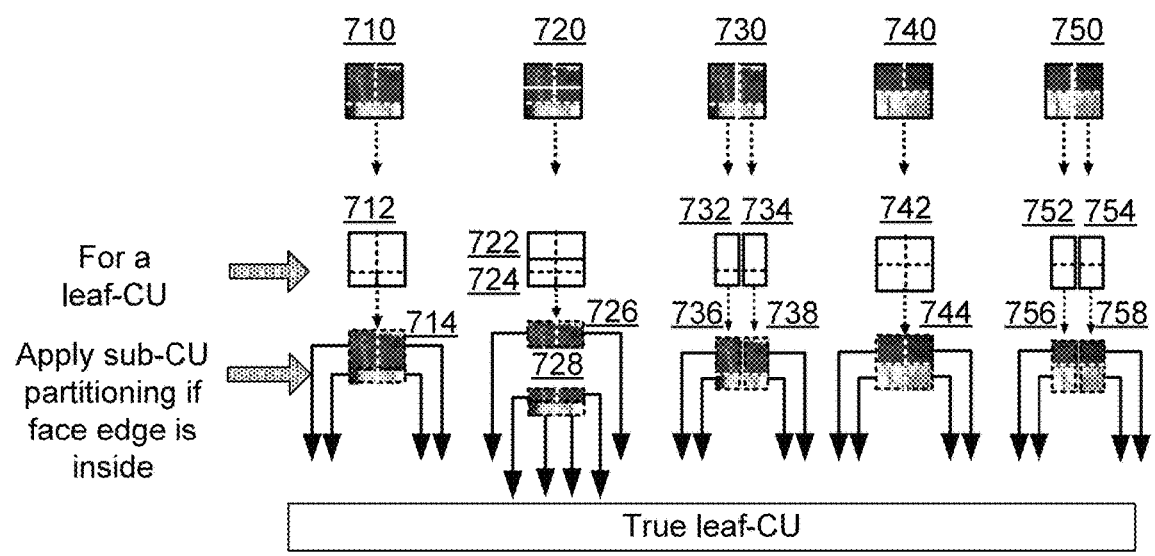
FIG. 7 illustrates another example of sub-CU partition according to Method A, where the leaf-CU containing a horizontal face edge and an intersecting vertical face edge.

FIG. 7 illustrates another example of sub-CU partition according to Method A, where the leaf-CU containing a horizontal face edge and an intersecting vertical face edge. In FIG. 7, block 710 corresponds to a leaf CU containing a horizontal face edge and a vertical face edge as shown as the dash lines, where the horizontal face edge is in the lower part of the block the vertical face edge is in the middle of the block. The conventional block partition for block 710 is shown in block 712 (i.e., no further partition). According to Method A, block 710 is divided into four sub-CUs 714 along the horizontal face edge and the vertical face edge. Block 720 corresponds to two leaf sub-CUs (722 and 724), where the top sub-CU contains a vertical face edge and the lower sub-CU contains both the horizontal and vertical face edges shown as dash lines. According to Method A, the top sub-CU 722 is partitioned along the vertical face edge into two sub-CUs 726 (i.e., left and right sub-CUs) and the bottom sub-CU 724 is divided into four sub-CUs 728 along the horizontal and vertical face edges. Block 730 corresponds to two leaf sub-CUs (732 and 734) containing a horizontal face edge in the lower part as shown as a dash line. Since the vertical face edge is aligned with the partition between block 732 and block 734, there is no vertical face edge within blocks 732 and 734. According to Method A, sub-CU 732 is divided into two sub-CUs 736 (i.e., top and bottom sub-CUs) along the face edge, and sub-CU 734 is divided into two sub-CUs 738 (i.e., top and bottom sub-CUs) along the face edge. Block 740 corresponds to a leaf CU containing a horizontal and vertical face edges shown as dash lines. The conventional block partition for block 740 is shown in block 742 (i.e., no further partition). According to Method A, block 740 is divided into four sub-CUs 744 (i.e., two top sub-CUs and two bottom sub-CUs) along the horizontal and vertical face edges. Block 750 corresponds to two leaf sub-CUs (752 and 754) containing a horizontal face edge in the middle as shown as a dash line. Since the vertical face edge is aligned with the partition between block 752 and block 754, there is no vertical face edge within blocks 752 and 754. According to Method A, sub-CU 752 is divided into two sub-CUs 756 (i.e., top and bottom sub-CUs) along the horizontal face edge, and sub-CU 754 is divided into two sub-CUs 758 (top and bottom sub-CUs) along the horizontal face edge.

According to Method A, the block partition is further applied to leaf-CUs along the face edge(s) if any face edge exists in the leaf-CU. For each projection format, the location(s) of the face edge(s) is known. On the other hand, the block location of a current block can be determined. Based on the information of block location/and block size and the face edge location, whether there is any face edge in the block can be determined without the need of signaling any indication.

Block Splitting Method B

While Method A discloses partition along the face edge, Method B discloses restricted partition as long as the maximum quadtree (QT) depth and/or maximum binary tree depth is not reached. Under the constrains of maximum QT or BT depth, this method applies QT partition or BT horizontal partition to the CU with a horizontal face edge inside, and applies QT partition or BT vertical partition to the CU with a vertical face edge inside. The maximum QT depth and maximum BT depth are limited for a CU. A CU cannot be split any further to avoid face edge inside when the constraint of maximum QT or BT depth is reached.

Figure 8A:
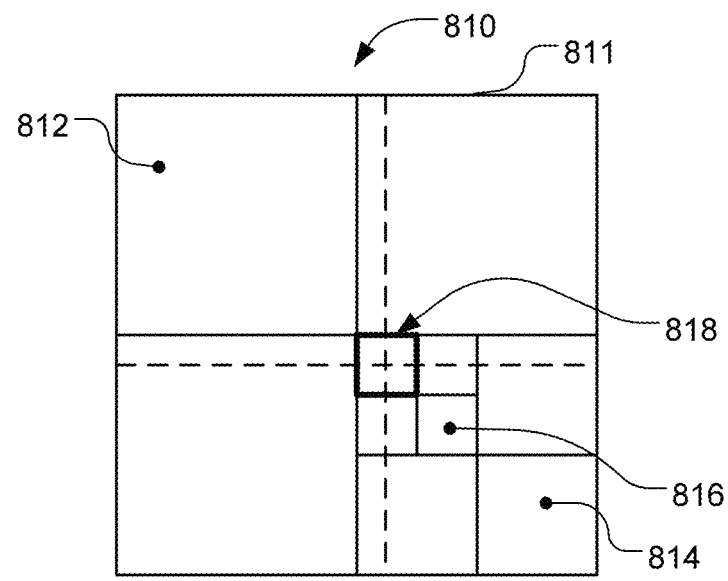
FIG. 8A illustrates examples of QT partition for VR pictures.
Figure 8B:
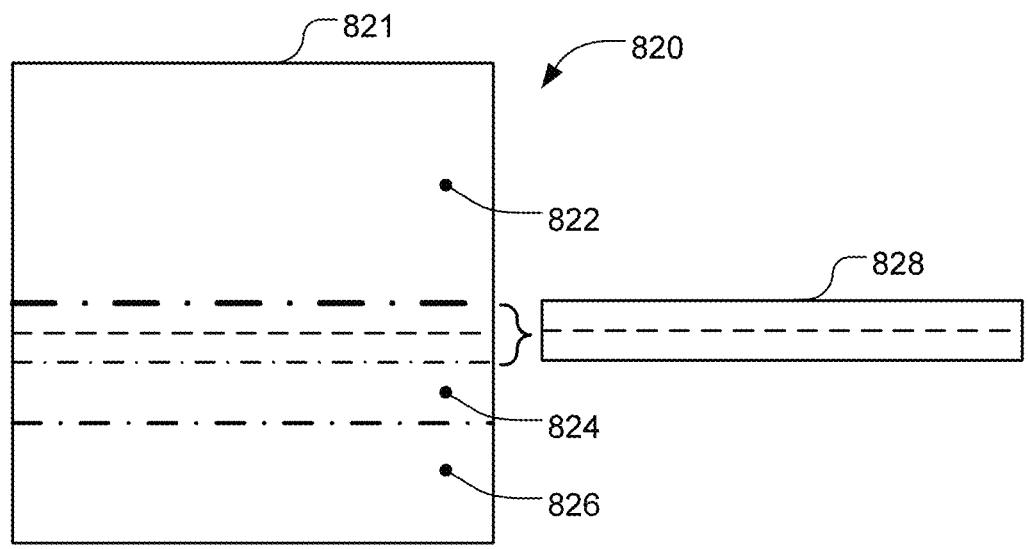
FIG. 8B illustrates examples of BT partition for VR pictures.

FIG. 8A illustrates examples of QT partition for VR pictures. In partition 810, a picture area 811 (e.g. a coding unit, CU) is partitioned using QT partition into leaf CUs, where solid lines indicate QT partition boundaries and the dash lines indicate face edges within the picture area. Some of the leaf CUs are free from a face edges such as leaf CUs 812, 814 and 816. The remaining leaf CUs contain one or more face edges. For example, leaf CU 818 contains both horizontal and vertical face edges. FIG. 8B illustrates examples of BT partition for VR pictures. In partition 820, a picture area 821 (e.g. a coding unit, CU) containing a horizontal face edge is partitioned using horizontal BT partition into leaf CUs, where dot-dash lines indicate horizontal BT partition boundaries and the dash line indicates a horizontal face edge within the picture area. Some of the leaf CUs are free from any face edges such as leaf CUs 822, 824 and 826. The remaining leaf CUs contain one or more face edges. For example, leaf CU 828 contains the horizontal face edge.

Figure 9:
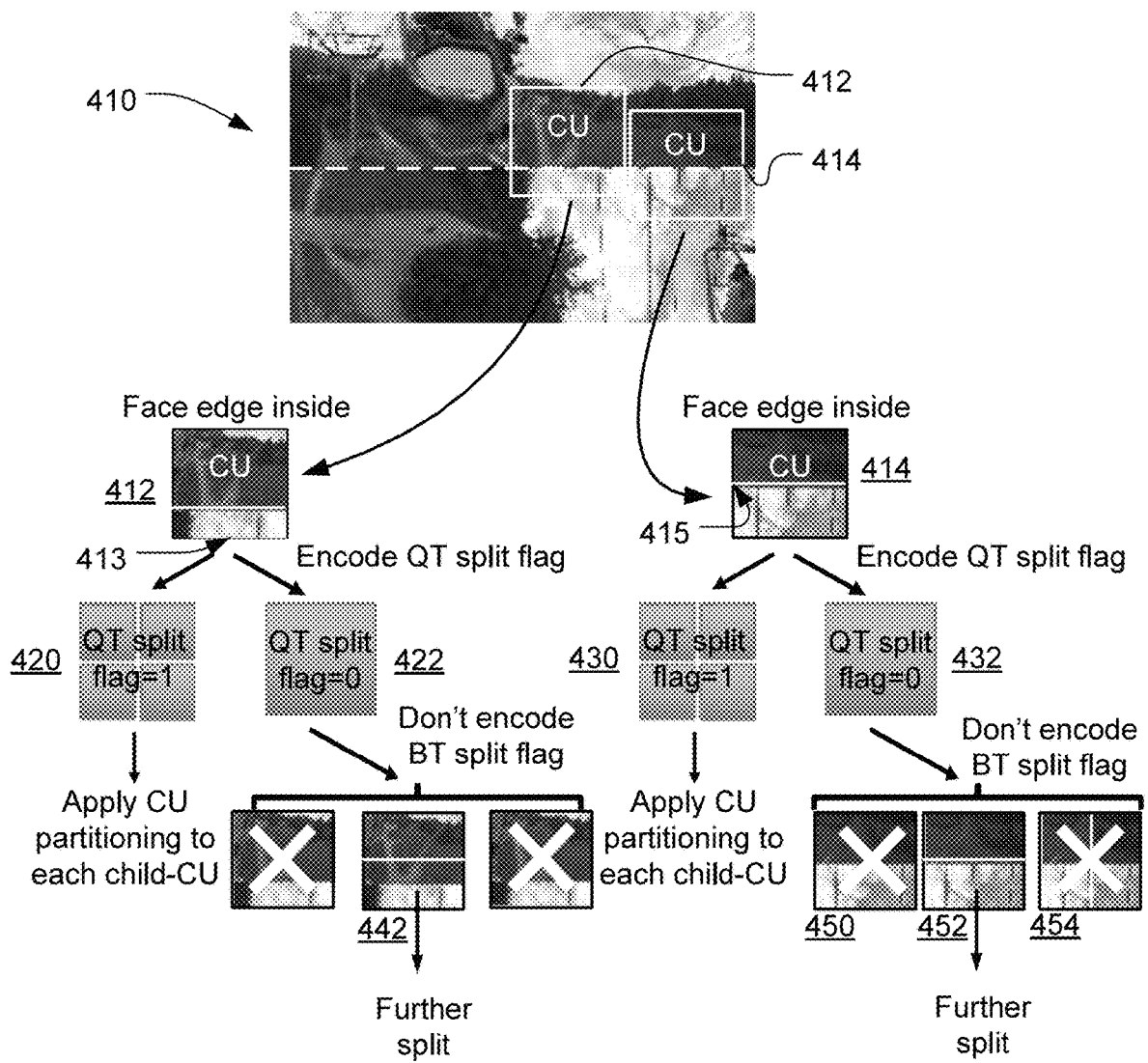
FIG. 9 illustrates an example of block partition according to Method B, where QT and horizontal BT are allowed for a block containing a horizontal face edge.

FIG. 9 illustrates an example of block partition according to Method B. The same picture area (e.g. a coding unit, CU) in FIG. 4 is used as a base to illustrate the QT/BT partition with constrained QT/BT depth. Since the picture area contains a horizontal face edge, only QT or horizontal BT partition is allowed. For block 412, three BT partition types (440, 442 and 444) would be considered according to the conventional partition method. However, according to the Method B, only the horizontal BT partition 442 is allowed since the block contains a horizontal face edge. In other words, the no BT partition 440 and vertical BT partition 444 are not allowed as indicated an "X over the block. Similarly, for block 414, three BT partition types (450, 452 and 454) would be considered according to the conventional partition method. However, according to the Method B, only the horizontal BT partition 452 is allowed since the block contains a horizontal face edge. In other words, the no BT partition 450 and vertical BT partition 454 are not allowed as indicated an "X" over the block.

Figure 10:
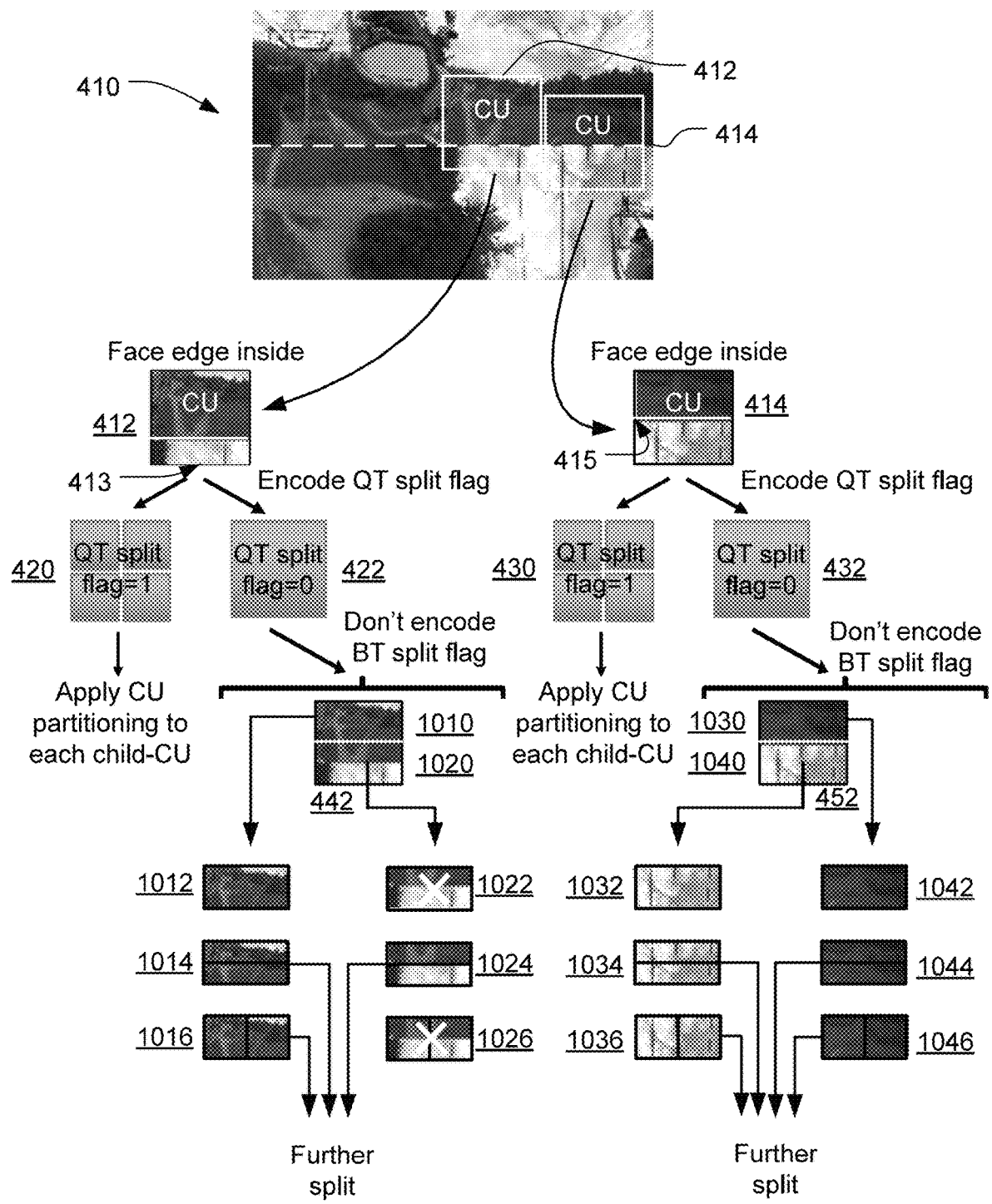
FIG. 10 illustrates an example of further block partition for the sub-blocks resulted from FIG. 9 according to Method B.

FIG. 10 illustrates an example of further block partition for the sub-blocks resulted from FIG. 9 according to Method B. The two sub-blocks (1010 and 1020) resulted from horizontal BT partition 442 can be further partitioned. For sub-block 1010, since there is no face edge in the sub-block, all three BT partition types (no partition 1012, horizontal partition 1014 and vertical partition 1016) are allowed. However, for sub-block 1020, there is a horizontal face edge in this sub-block. Accordingly, only horizontal BT 1024 partition is allowed. Both no partition 1022 and vertical partition 1026 are not allowed for sub-block 1020. The two sub-blocks (1030 and 1040) resulted from horizontal BT partition 452 can be further partitioned. In this case, the face edge is aligned with the partition boundary between sub-block 1030 and sub-block 1040. There is no face edge within sub-block 1030 and sub-block 1040. Accordingly, both sub-block 1030 and sub-lock 1040 can be partitioned using all three BT partition types (i.e., no partition 1032, horizontal partition 1034 and vertical partition 1036 for sub-block 1030, and no partition 1042, horizontal partition 1044 and vertical partition 1046 for sub-block 1040) since there is no face edge in the sub-block.

Figure 11:
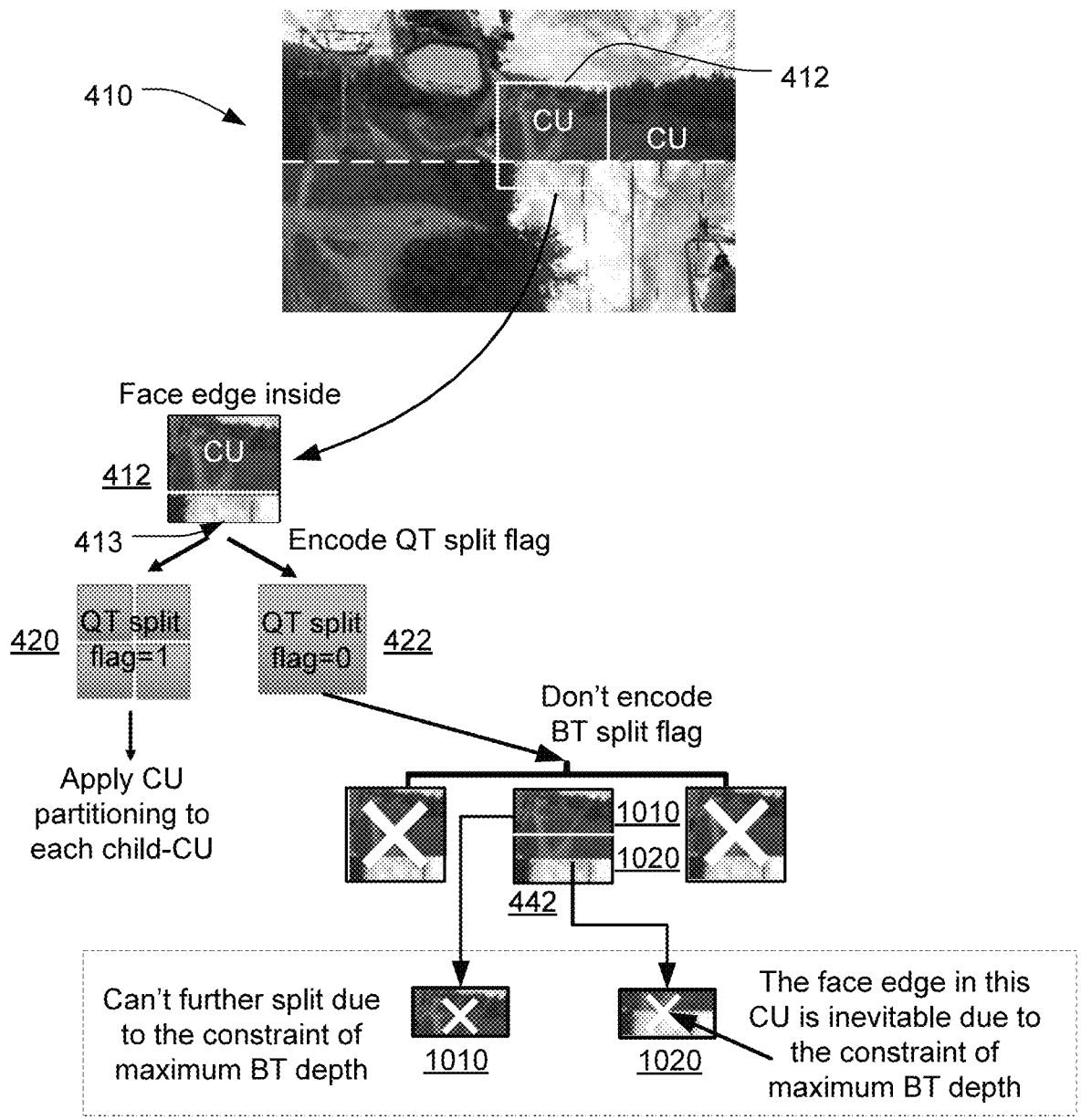
FIG. 11 illustrates an example of block partition with further constraint on partition depth according to an embodiment of the present invention.

The partition Method B also take into account of the QT or BT depth as a criterion regarding terminating the partition. FIG. 11 illustrates an example of block partition with further constraint on partition depth. The same picture area (e.g. a coding unit, CU) in FIG. 4 is used as a base to illustrate the block partition according to embodiments of the present invention. For block 412, the horizontal BT partition 442 is allowed to further split as shown in FIG. 10. However, according to this additional partition depth constraint, whether to further split may depend on the partition depth. For example, if BT horizontal partition is allowed for BT partition depth equal to 1, sub-block 1010 and sub-block 1020 cannot be further split as indicated by an "X" over the sub-blocks. Therefore, the face edge in sub-block 1020 becomes inevitable due to the depth constraint.

Figure 12A:
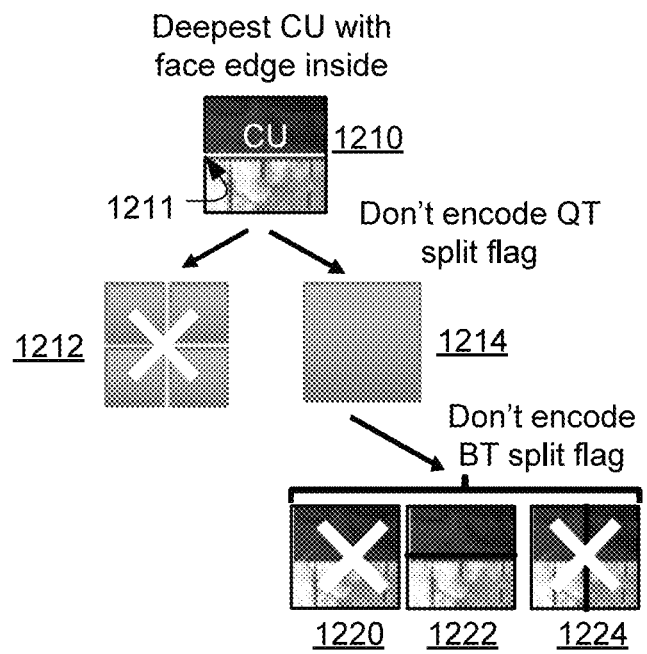
FIG. 12A illustrates an example of partition Method B with maximum QT depth constraint according to an embodiment of the present invention.

FIG. 12A illustrates an example of partition Method B with maximum QT depth constraint. CU 1210 corresponds to a CU with the deepest QT partition depth allowed. Therefore, QT partition 1212 is not allowed, which leaves the block un-partitioned 1214. If there is no constraint on BT depth or the BT depth has not reached the maximum BT depth yet, block 1210 can be further partitioned using horizontal BT partition 1222, The no BT partition 1220 and vertical BT partition 1224 are not allowed according to embodiments of the present invention since there is a horizontal face edge in CU 1210. Since the maximum QT partition depth has been reached, further QT partition is not allowed. In other words, the CU is forced to use no QT partition. Therefore, there is no need to signal the selection of "no QT partition" for this CU. Furthermore, among the BT partition choices (i.e., no, horizontal and vertical), there is no need to signal the choice either since there is a horizontal face edge in the CU and only horizontal BT partition is allowed for this CU.

For each projection format, the location(s) of the face edge(s) is known. On the other hand, the block location of a current block can be determined. Based on the information of block location/and block size and the face edge location, whether there is any face edge in the block can be determined without the need of signaling any indication.

Figure 12B:
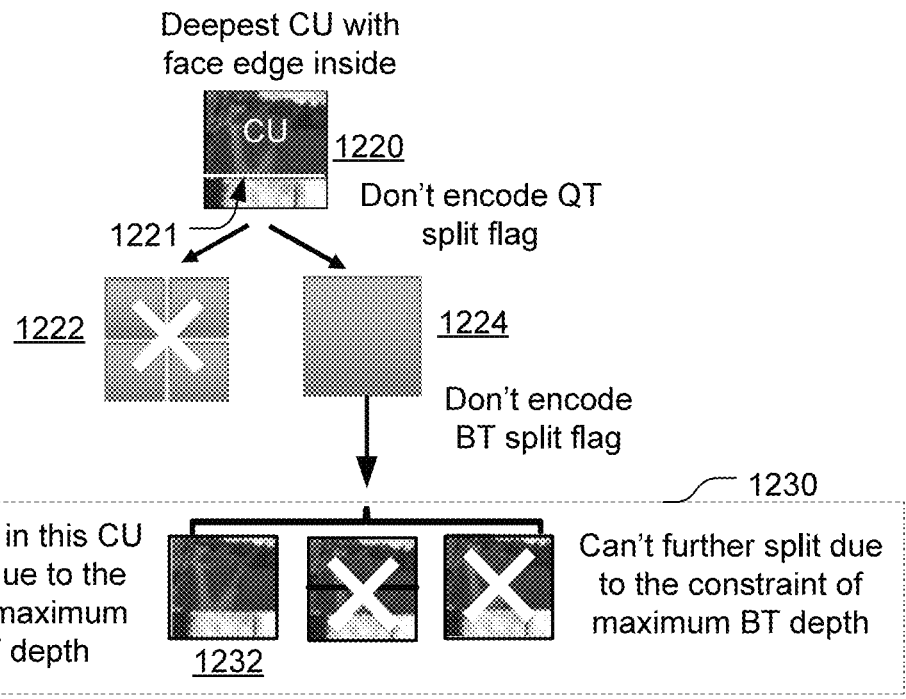
FIG. 12B illustrates another example of partition Method B with maximum QT and BT depth constraint according to an embodiment of the present invention.

FIG. 12B illustrates another example of partition Method B with maximum QT and BT depth constraint. CU 1220 containing a face edge 1221 corresponds to a CU with the deepest QT partition depth allowed. Therefore, QT partition 1222 is not allowed, which leaves the block un-partitioned 1224. However, the BT partition depth also reaches its maximum depth. Therefore, neither the horizontal or vertical BT can be allowed (as shown by an "X" over the blocks in dash box 1230, which leaves the block un-partitioned 1232, which inevitable.

In the above example, the Method B is illustrated for a CU containing only one face edge for the horizontal face edge. When the CU contains only one vertical face edge, similar partition process can be applied by replacing the horizontal BT partition with the vertical BT partition.

Figure 13:
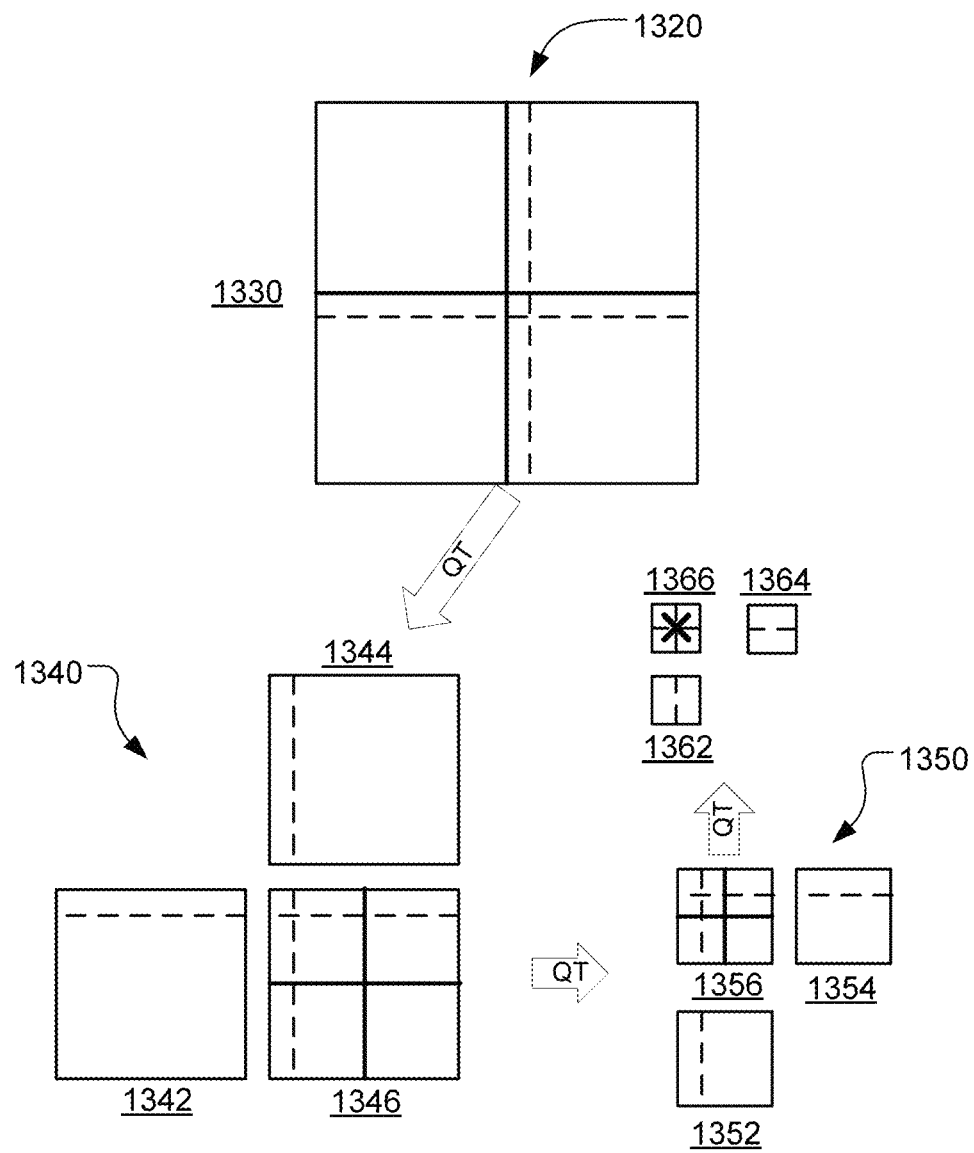
FIG. 13 illustrates another example of block partition according to an embodiment of Method B, where a CU contains two face edges.

FIG. 13 illustrates another example of block partition according to an embodiment of Method B, where a CU contains two face edges. For a CU with multiple face edges inside, the QT partitioning is applied recursively to the CU until reaching the maximum QT depth or the child-CUs only with one edge or no edge inside. For the child-CUs without face edge inside, the regular partitioning method can be applied to the child CU. For the child-CUs with one edge inside, the block partition for CU with only one face edge mentioned above can be applied. For the leaf-CU reaching the constrains of maximum QT depth, but still containing face edges inside, the leaf CU could not be further split and the edges inside become inevitable. In FIG. 13, block partition 1320 illustrates the partition process according to Method B with constraint on the maximum QT depth (e.g. Maximum QT depth=4). Partition 1320 corresponds to the first stage QT partition applied to CU 1330, where the solid lines indicate QT partition boundaries and the dash lines indicates face edges. As shown in partition 1320, the upper left sub-CU contains no face edge and the sub-CU can be further processed using regular block partition. The remaining three sub-CUs (i.e., 1342, 1344 and 1346) still contain one or more face edges. The second stage block partition 1340 is applied to these three sub-CUs. For sub-CU 1342 and 1344, there is only on face edge within each sub-CUs, the horizontal or vertical BT partition as mentioned before will be applied. For sub-CU 1346, the QT partition is applied again. After the second-stage QT is applied to block 1346, the lower-right sub-CU contains no face edge and regular partition can be applied to the lower-right sub-CU. The remaining three sub-CUs (i.e., 1352, 1354 and 1356) still contain one or more face edges. The third stage block partition 1350 is applied to these three sub-CUs. For sub-CU 1352 and 1354, there is only on face edge within each sub-CUs, and the horizontal or vertical BT partition as mentioned before will be applied. For sub-CU 1356, the QT partition is applied again. After the third-stage QT is applied to block 1356, the lower-right sub-CU contains no face edge and regular partition can be applied to the lower-right sub-CU. The remaining three sub-CUs (1362, 1364 and 1366) still contain one or more face edges. For sub-CU 1362 and 1364, there is only on face edge within each sub-CUs, and the horizontal or vertical BT partition as mentioned before will be applied. For sub-CU 1366, the maximum QT depth (i.e., 4) has been reached. Therefore, according to an embodiment of Method B, sub-CU 1366 cannot be further partitioned by QT partition, which leaves the face edges inside the sub-CU inevitable.

Figure 14:
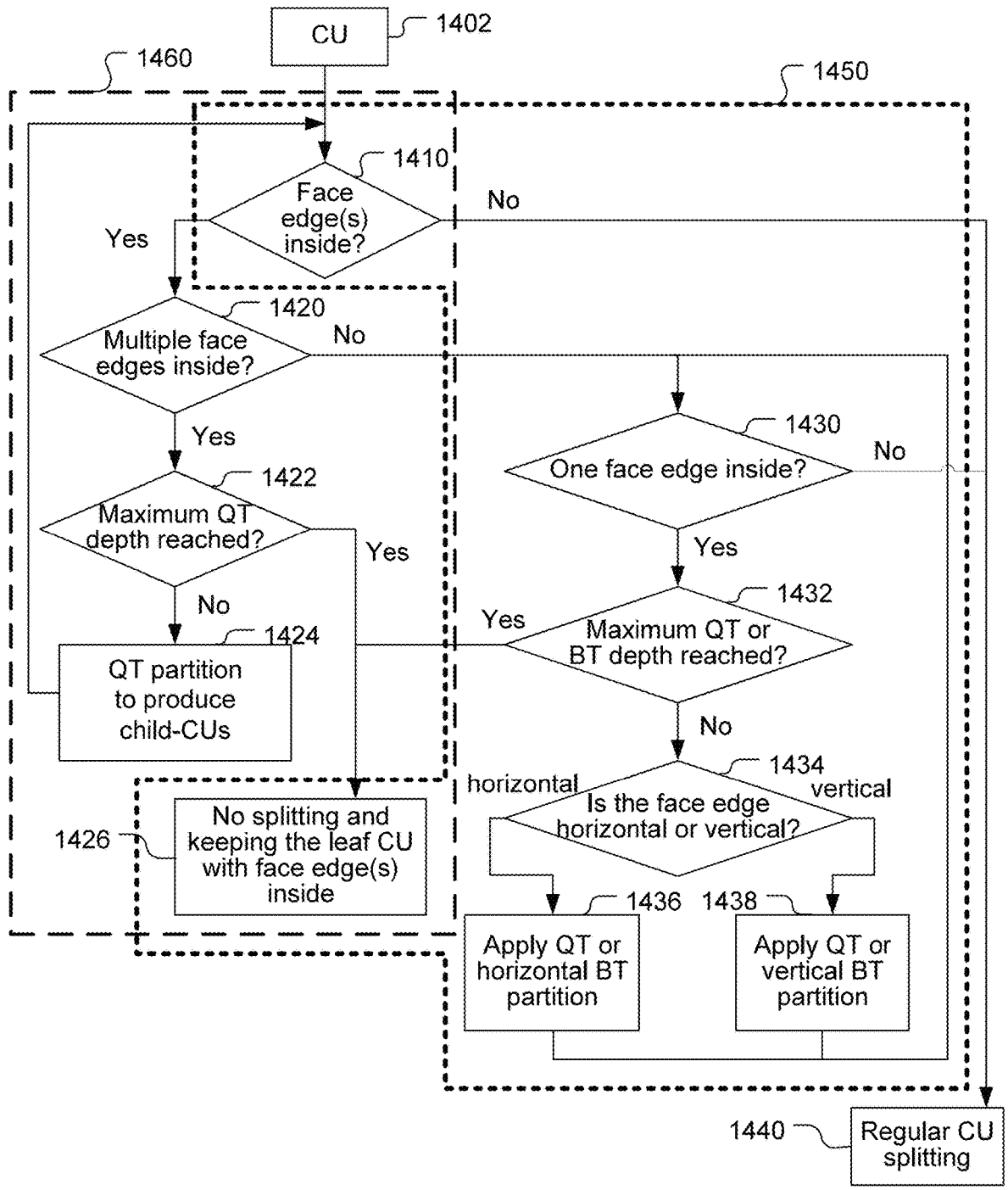
FIG. 14 illustrates an example of flowchart for block partition according to an embodiment of the Method B in the case of one or more face edges in a CU.

An example of flowchart for block partition based on the Method B in the case of one or more face edges in a CU is shown in FIG. 14. An input CU 1402 is first checked to determine whether there is any face edge in the CU as shown in step 1410. If there is no face edge in the CU (i.e., the "No" path from step 1410), the block is processed by regular CU partition as shown in step 1440. If there is any face edge in the CU (i.e., the "Yes" path from step 1410), the block is further checked to determine whether there are multiple face edges inside the CU as shown in step 1420. If there are multiple face edges in the CU (i.e., the "Yes" path from step 1420), the CU is further checked to determine whether the maximum QT depth is reached in step 1422. If the maximum QT depth is not reached (i.e., the "No" path from step 1422), the CU is partitioned into child-CUs as shown in step 1424. Each child-CU is treated as a new CU and the block partition process iterates by entering step 1410. If the maximum QT depth is reached (i.e., the "Yes" path from step 1422), the CU is not partitioned and stays as a leaf CU, which still contains face edges as shown in step 1426. In step 1420, if there are no multiple face edges (i.e., the "No" path from 1420), step 1430 is performed to check whether there is one face edge exists. If there is no face edge in the CU (i.e., the "No" path from step 1430), the block is processed by regular CU partition as shown in step 1440. If there is one face edge in the CU (i.e., the "Yes" path from step 1430), whether the maximum QT depth or maximum BT depth for the block is reached is checked in step 1432. If the maximum QT depth or maximum BT depth for the block is reached (i.e., the "Yes" path from step 1432), the CU is not partitioned and stays as a leaf CU, which still contains a face edge as shown in step 1426. If the maximum QT depth and maximum BT depth for the block is not reached (i.e., the "No" path from step 1432), the CU is checked to determine whether the CU contains a vertical face edge or a horizontal face edge as shown in step 1434. If the face edge is horizontal, QT partition or horizontal BT partition is applied to split the CU into multiple sub-CUs as shown in step 1436 and the process for each new CU (i.e., each sub-CU) iterates by going to step 1430. If the face edge is vertical, QT partition or vertical BT partition is applied to split the CU into multiple sub-CUs as shown in step 1438 and the process for each new CU (i.e., each sub-CU) iterates by going to step 1430.

Figure 15:
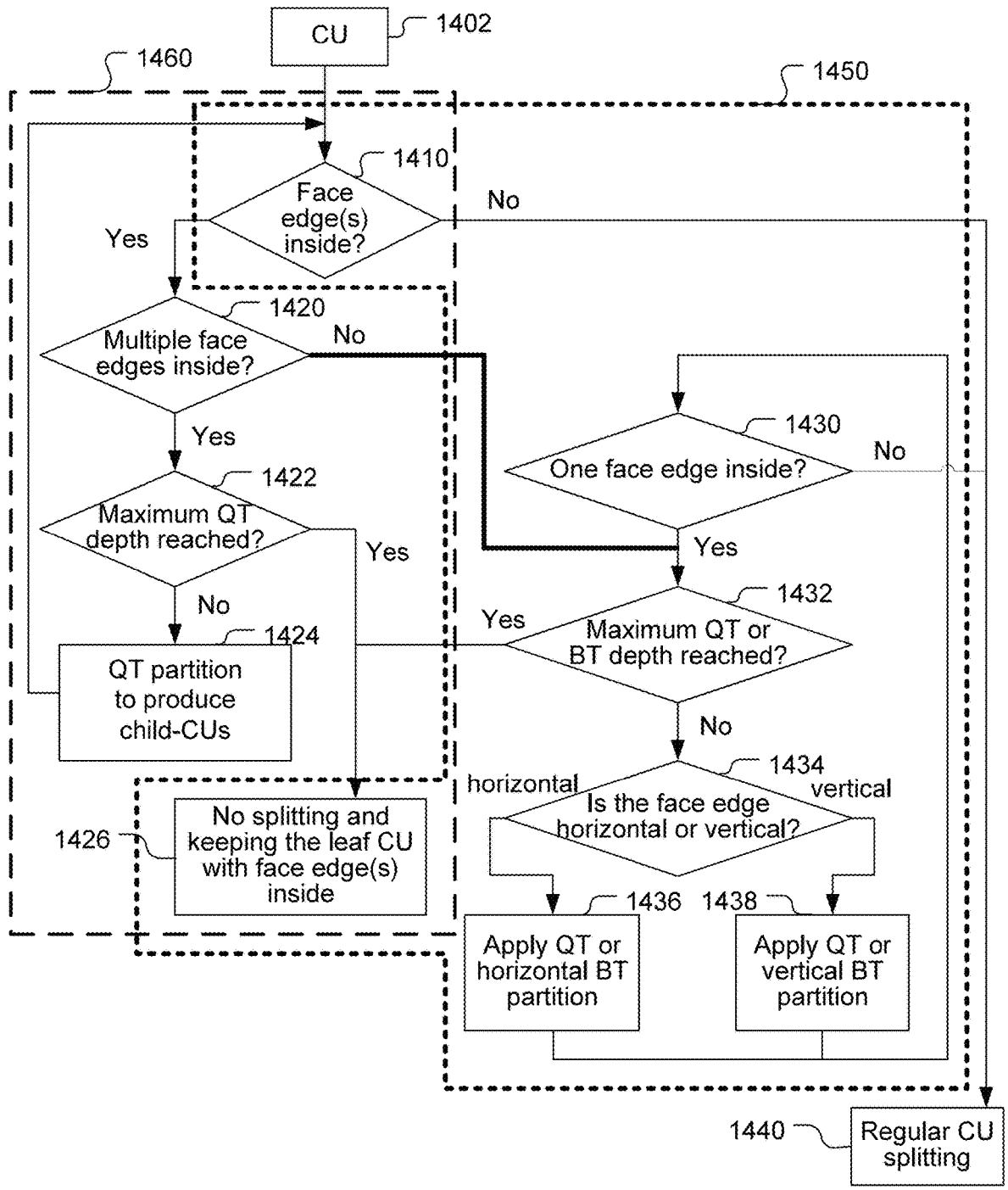
FIG. 15 illustrates an example of flowchart similar to that in FIG. 14 except for the case that no multiple face edges inside the CU.

An example of flowchart for block partition based on the Method B in the case of one or more face edges in a CU is shown in FIG. 15. The flowchart is similar to that in FIG. 14 except for the case that no multiple face edges inside the CU. In FIG. 14, if there are no multiple face edges in step 1420 (i.e., the "No" path), step 1430 is performed to check whether there is one face edge exists. In FIG. 15, if there are no multiple face edges in step 1420 (i.e., the "No" path), step 1432 is performed to check whether the maximum QT depth or maximum BT depth for the block is reached.

In the above, block partition according to embodiments of the present invention are disclosed. In case 1, a CU does not have any face edge inside. For the CU without any face edge, an embodiment of the present invention allows all splitting modes (non-split, QT partition, BT horizontal partition, BT vertical partition) if the block partition does not reach the maximum QT/BT depth. In case 2, a CU has one horizontal face edge. For the CU with one horizontal face edge, an embodiment of the present invention allows splitting modes of QT partition if the maximum QT depth not been reached, and allows BT horizontal partition if the maximum BT depth not been reached. If the CU has reached its maximum QT or BT depth, the CU will not be further split. In case 3, a CU has one vertical face edge. For the CU with one vertical face edge, an embodiment of the present invention allows splitting modes of QT partition if the maximum QT depth not been reached, and allows BT vertical partition if the maximum BT depth not been reached. If the CU has reached its maximum QT and BT depth, the CU will not be further split. In case 4, a CU has multiple face edges. For the CU with multiple face edges, only allows QT partition is allowed if the maximum QT depth is not reached. For a CU that reaches maximum QT depth and it contains multiple face edges, the CU will not be further split.

Figure 16:
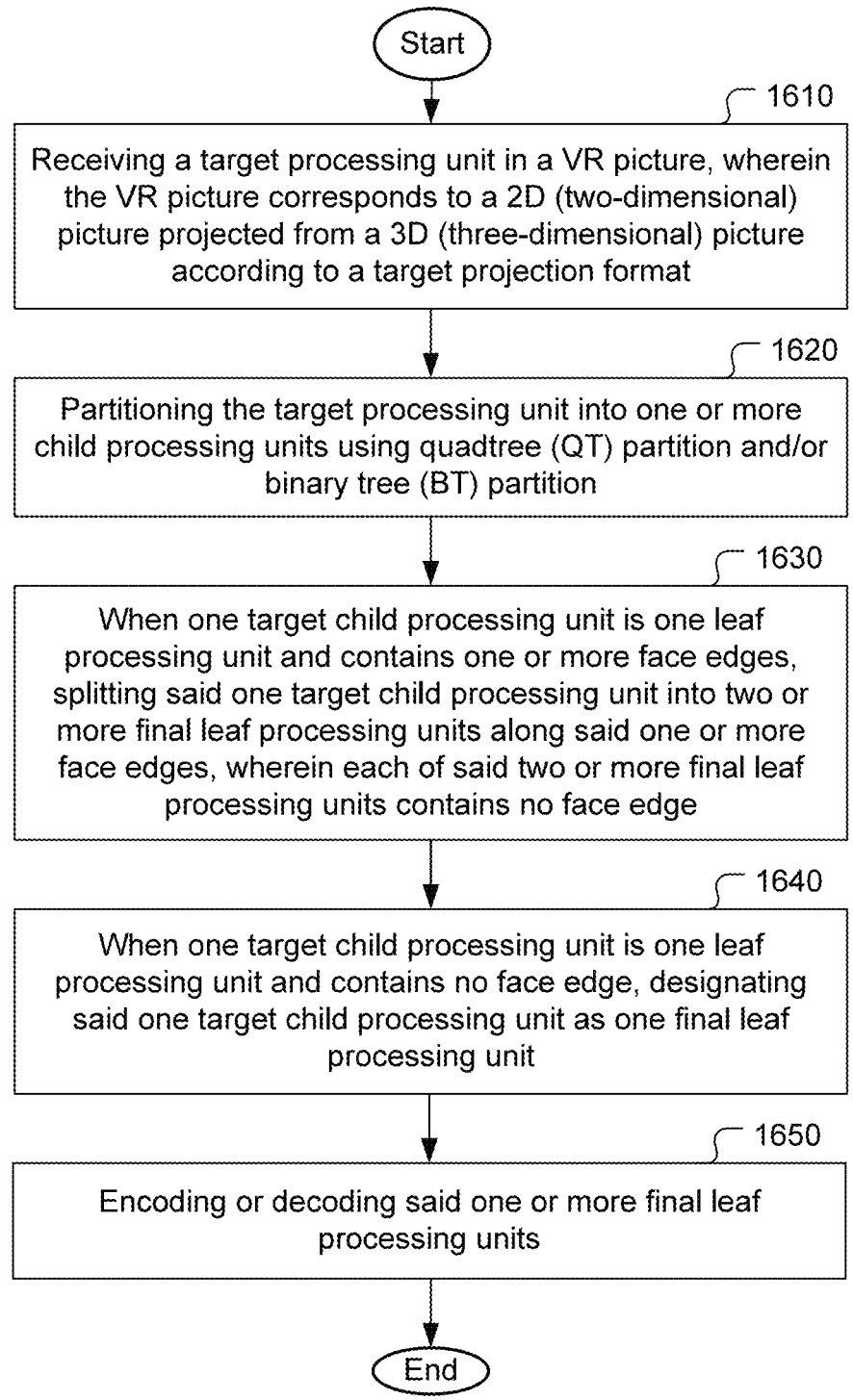
FIG. 16 illustrates an exemplary block diagram of a system incorporating the block partition method according to an embodiment of the present invention, where a leaf CU with a face edge is split into multiple sub-CUs along the face edge.

FIG. 16 illustrates an exemplary block diagram of a system incorporating the block partition method according to an embodiment of the present invention, where a leaf CU with a face edge is split into multiple sub-CUs along the face edge. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, a target processing unit in a VR picture is received in step 1610, wherein the VR picture corresponds to a 2D (two-dimensional) picture projected from a 3D (three-dimensional) picture according to a target projection format. The target processing unit is partitioned into one or more child processing units using quadtree (QT) partition and/or binary tree (BT) partition in step 1620. In step 1630, when one target child processing unit is one leaf processing unit and contains one or more face edges, said one target child processing unit is split into two or more final leaf processing units along said one or more face edges, wherein each of said two or more final leaf processing units contains no face edge. In step 1640, when one target child processing unit is one leaf processing unit and contains no face edge, said one target child processing unit is designated as one final leaf processing unit. Said one or more final leaf processing units are encoded or decoded in step 1650.

Figure 17:
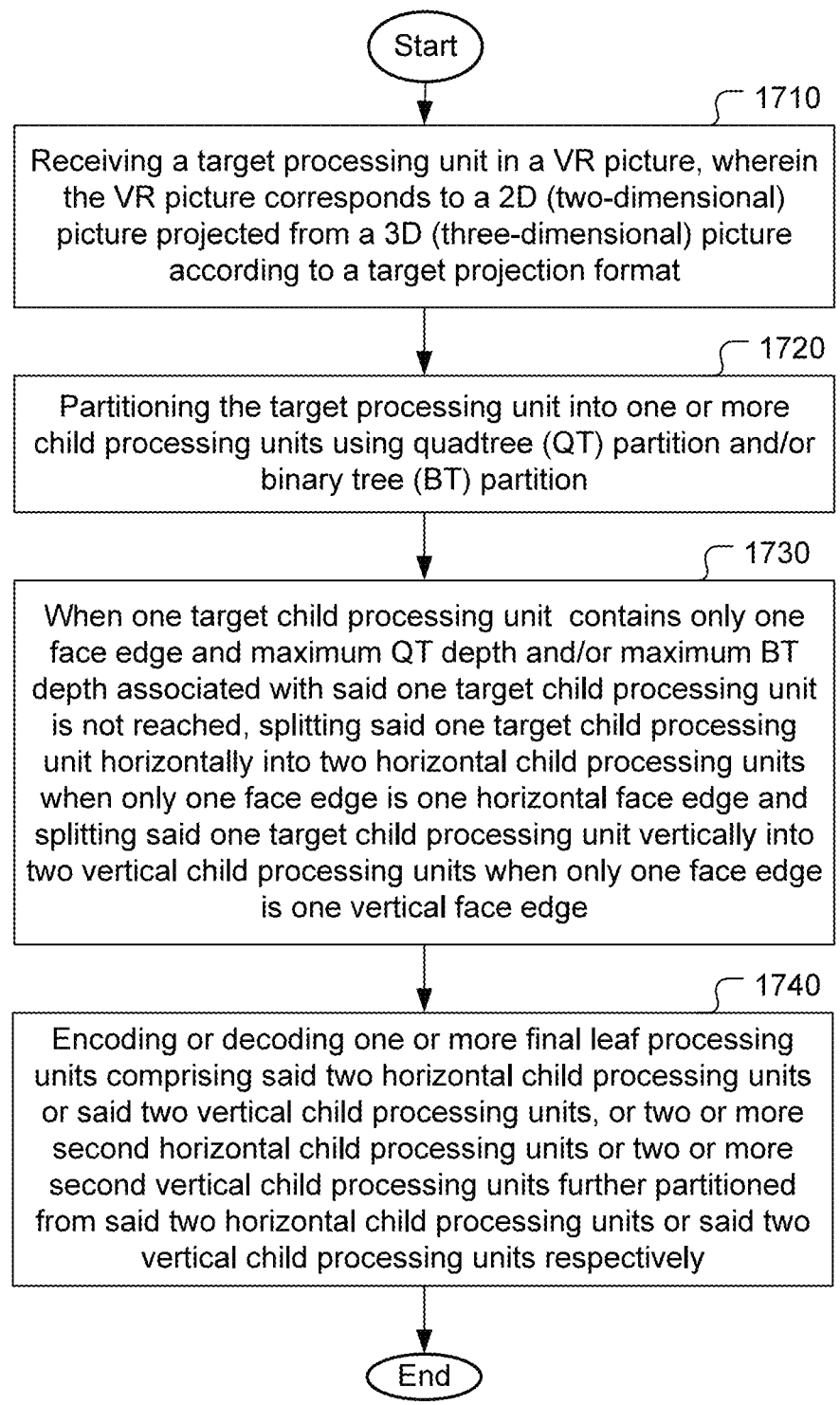
FIG. 17 illustrates an exemplary block diagram of a system incorporating the block partition method according to an embodiment of the present invention, where a leaf CU with a face edge is split using QT/horizontal BT partition or QT/vertical BT partition if the maximum QT or BT is not reached.

FIG. 17 illustrates an exemplary block diagram of a system incorporating the block partition method according to an embodiment of the present invention, where a leaf CU with a face edge is split using QT/horizontal BT partition or QT/vertical BT partition if the maximum QT or BT is not reached. According to this method, a target processing unit in a VR picture is received in step 1710, wherein the VR picture corresponds to a 2D (two-dimensional) picture projected from a 3D (three-dimensional) picture according to a target projection format. The target processing unit is partitioned into one or more child processing units using quadtree (QT) partition and/or binary tree (BT) partition in step 1720. In step 1730, if one target child processing unit contains only one face edge and maximum QT depth and/or maximum BT depth associated with said one target child processing unit is not reached, said one target child processing unit is split horizontally into two horizontal child processing units when only one face edge is one horizontal face edge and said one target child processing unit is split vertically into two vertical child processing units when only one face edge is one vertical face edge. One or more final leaf processing units are encoded of decoded, where said one or more final leaf processing units comprise said two horizontal child processing units or said two vertical child processing units, or two or more second horizontal child processing units or two or more second vertical child processing units further partitioned from said two horizontal child processing units or said two vertical child processing units respectively.

The flowcharts shown above are intended for serving as examples to illustrate embodiments of the present invention. A person skilled in the art may practice the present invention by modifying individual steps, splitting or combining steps with departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding for a video encoder or decoder, the method comprising:
   receiving a target processing unit in a VR picture, wherein the VR picture corresponds to a 2D (two-dimensional) picture projected from a 3D (three-dimensional) picture according to a target projection format;
   partitioning the target processing unit into one or more child processing units using quadtree (QT) partition and/or binary tree (BT) partition;
   when one target child processing unit contains only one face edge and maximum QT depth and/or maximum BT depth associated with said one target child processing unit is not reached, splitting said one target child processing unit horizontally into two horizontal child processing units when only one face edge is one horizontal face edge and splitting said one target child processing unit vertically into two vertical child processing units when only one face edge is one vertical face edge; and
   encoding or decoding one or more final leaf processing units comprising said two horizontal child processing units or said two vertical child processing units, or two or more second horizontal child processing units or two or more second vertical child processing units further partitioned from said two horizontal child processing units or said two vertical child processing units respectively.

2. The method of claim 1 further comprising, when one target child processing unit contains two or more face edges and the maximum QT depth and/or the maximum BT depth associated with said one target child processing unit is not reached, splitting said one target child processing unit horizontally and vertically into four third child processing units.

3. The method of claim 2 further comprising if one third child processing unit contains only one face edge and maximum QT depth and/or maximum BT depth associated with said one third child processing unit is not reached, splitting said one third child processing unit horizontally into two fourth horizontal child processing units when only one face edge in said one third child processing unit is one horizontal face edge, and splitting said one third child processing unit vertically into two fourth vertical child processing units when only one face edge in said one third child processing unit is one vertical face edge; and wherein said one or more final leaf processing units comprise said two fourth horizontal child processing units or said two fourth vertical child processing units, or two or more fifth horizontal child processing units further partitioned from said two fourth horizontal child processing units or two or more fifth vertical child processing units further partitioned from said two fourth vertical child processing units.

4. The method of claim 1 further comprising, when one target child processing unit contains no face edge and the maximum QT depth and/or the maximum BT depth associated with said one target child processing unit is not reached, splitting said one target child processing unit using the QT partition or the BT partition into one or more sixth child processing units.

5. The method of claim 1 further comprising, when the maximum QT depth and/or the maximum BT depth associated with said one target child processing unit is reached, said one target child processing unit is not further partitioned and said one or more final leaf processing units comprises said one target child processing unit.

6. The method of claim 1, wherein information regarding whether one target child processing unit contains any face edge is indicated implicitly without signaling the information.

7. The method of claim 1, wherein whether one target child processing unit contains any face edge is determined based on a block location and block size of said one target child processing unit in the VR picture and one or more face edge locations of the VR picture in the target projection format.

8. The method of claim 1, wherein the target projection format corresponds to Cubemap Projection (CMP), Barrel layout, Segmented-Sphere Projection (SSP), Octahedron Projection (OHP), Rotated Sphere Projection (RSP), Icosahedron Projection (LISP), Adjusted Cubemap Projection (ACP).

9. The method of claim 1, wherein the target processing unit corresponds to one coding unit (CU).

10. An apparatus of for video coding, the apparatus comprising one or more electronic circuitries or processors arranged to:
    receive a target processing unit in a VR picture, wherein the VR picture corresponds to a 2D (two-dimensional) picture projected from a 3D (three-dimensional) picture according to a target projection format;
    partition the target processing unit into one or more child processing units using quadtree (QT) partition and/or binary tree (BT) partition;
    when one target child processing unit contains only one face edge and maximum QT depth and/or maximum BT depth associated with said one target child processing unit is not reached, split said one target child processing unit horizontally into two horizontal child processing units when only one face edge is one horizontal face edge and splitting said one target child processing unit vertically into two vertical child processing units when only one face edge is one vertical face edge; and
    encode or decode one or more final leaf processing units comprising said two horizontal child processing units or said two vertical child processing units, or two or more second horizontal child processing units or two or more second vertical child processing units further partitioned from said two horizontal child processing units or said two vertical child processing units respectively.

* * * * *